United States Patent
Hoof et al.

(10) Patent No.: US 9,390,487 B2
(45) Date of Patent: Jul. 12, 2016

(54) SCENE EXPOSURE AUTO-COMPENSATION FOR DIFFERENTIAL IMAGE COMPARISONS

(71) Applicant: Microsoft Technology Licensing, LLC, Redmond, WA (US)

(72) Inventors: Jonathan Ross Hoof, Kenmore, WA (US); Benjamin William Walker, Seattle, WA (US); Beibei Cheng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/518,915

(22) Filed: Oct. 20, 2014

(65) Prior Publication Data

US 2016/0110856 A1  Apr. 21, 2016

(51) Int. Cl.
- G06K 9/40 (2006.01)
- G06T 5/50 (2006.01)
- G06T 11/00 (2006.01)
- G06T 5/00 (2006.01)

(52) U.S. Cl.
CPC . G06T 5/50 (2013.01); G06T 5/001 (2013.01); G06T 11/00 (2013.01)

(58) Field of Classification Search
None
See application file for complete search history.

(56) References Cited

U.S. PATENT DOCUMENTS

| | | | |
|---|---|---|---|
| 5,703,644 A | 12/1997 | Mori et al. | |
| 5,828,780 A | 10/1998 | Suzuki et al. | |
| 6,215,914 B1 | 4/2001 | Nakamura et al. | |
| 6,337,917 B1* | 1/2002 | Onural | G06T 7/20 375/E7.081 |
| 6,778,207 B1 | 8/2004 | Lee et al. | |
| 7,184,054 B2 | 2/2007 | Clark | |
| 8,594,460 B2 | 11/2013 | Lindskog et al. | |
| 8,682,097 B2 | 3/2014 | Steinberg et al. | |
| 8,923,652 B2* | 12/2014 | Gallo | G06T 3/0081 382/274 |
| 2003/0095178 A1 | 5/2003 | Shibayama | |
| 2007/0047834 A1* | 3/2007 | Connell | G06T 5/50 382/274 |
| 2009/0190181 A1 | 7/2009 | Ohkawa | |
| 2011/0069175 A1* | 3/2011 | Mistretta | G06T 5/50 348/164 |
| 2012/0019728 A1* | 1/2012 | Moore | H04N 5/144 348/678 |
| 2012/0257071 A1* | 10/2012 | Prentice | H04N 5/2625 348/220.1 |
| 2013/0002810 A1* | 1/2013 | Stauder | H04N 13/0037 348/42 |
| 2013/0096439 A1 | 4/2013 | Lee et al. | |
| 2013/0250322 A1* | 9/2013 | Kawabata | H04N 1/60 358/1.9 |
| 2013/0329092 A1 | 12/2013 | Wong | |
| 2014/0099022 A1* | 4/2014 | McNamer | G06T 11/001 382/164 |
| 2014/0119595 A1 | 5/2014 | Gallo et al. | |
| 2015/0029359 A1* | 1/2015 | Nenonen | H04N 5/2354 348/224.1 |

(Continued)

OTHER PUBLICATIONS

Ilie, Adrian, and Greg Welch. "Ensuring color consistency across multiple cameras." Computer Vision, 2005. ICCV 2005. Tenth IEEE International Conference on. vol. 2. IEEE, 2005.*

(Continued)

*Primary Examiner* — Li Liu

(74) *Attorney, Agent, or Firm* — Dan Choi; Judy Yee; Micky Minhas

(57) ABSTRACT

Changes in image exposure setting may be compensated by creating a table of aggregate differences between corresponding pixels in two images and applying the table of aggregate differences to a portion of one of the two images. The images may be in any color space for visible light, or images not of visible light, such as infrared or depth images. In various configurations, the differences may be aggregated by averaging the differences for pixels of a certain value in one of the two images.

18 Claims, 8 Drawing Sheets

(56) References Cited

U.S. PATENT DOCUMENTS

| | | | | |
|---|---|---|---|---|
| 2015/0043786 A1* | 2/2015 | Ohki | .................. | H04N 5/23254 382/107 |
| 2015/0243324 A1* | 8/2015 | Sandrew | .............. | G11B 27/031 386/278 |
| 2015/0288933 A1* | 10/2015 | Iversen | ................... | G06F 3/147 348/14.07 |

OTHER PUBLICATIONS

Shao, Feng, et al. "A content-adaptive multi-view video color correction algorithm." Acoustics, Speech and Signal Processing, 2007. ICASSP 2007. IEEE International Conference on. vol. 1. IEEE, 2007.*

Jung, et al., "Color Correction for Multi-view Images Using Relative Luminance and Chrominance Mapping Curves", In Journal of Signal Processing Systems vol. 72 Issue 2,Aug. 1, 2013, 13 pages.

Wang, et al., "Automatic Local Exposure Correction Using Bright Channel Prior for Under-Exposed Images", In Journal of Signal Processing, vol. 93, Issue 11, Nov. 11, 2013; p. 3227-3238.

"International Search Report & Written Opinion Issued in PCT Application No. PCT/US2015/055411", Mailed Date: Feb. 5, 2016, 14 Pages.

"Xbox One Kinect Official Tech Demo Videos (inside Brains, Heart & Behind the Eyes (HD)", Retrieved from https://www.youtube.com/watch?v=NDTgx1Zi-n0, Oct. 2, 2013, 1 Page.

* cited by examiner

SCENE EXPOSURE AUTO-COMPENSATION FOR DIFFERENTIAL IMAGE COMPARISONS

BACKGROUND

Modern image and video capture systems may automatically adjust exposure settings to capture better quality images. In addition to camera adjustments such as adjustments to shutter speed or aperture, digital video capture often also includes digital exposure correction before storing each captured image. Digital exposure correction can include processing such as color balancing and gamma correction. In video capture systems, these adjustments are usually dynamic, changing the adjustments between captured frames as a scene being captured, changes or as lighting on the scene changes. Video capture systems may not always produce consistent representations of the same scene over time.

SUMMARY

As described herein, an apparatus may comprise a processor; and memory coupled to the processor, the memory comprising executable instructions that, when executed by the processor, cause the processor to effectuate operations comprising: generating a masked reference image by applying a mask to a reference image, the masked reference image comprising a plurality of pixels that represent a part of a scene; generating an estimate of compensation for compensating a particular pixel value of pixels contained in the masked reference image by aggregating differences between the particular pixel value and the values of pixels in a second image that corresponds to the pixels in the masked reference image with the particular pixel value, wherein a pixel in the reference image corresponds to a pixel in the second image when pixels represent the same part of the scene; and generating a compensated image portion of the reference image by adding the estimate to the value of pixels that are both in a compensation portion of the reference image and also have pixel values equal to the particular pixel value.

A method as described herein may comprise determining a difference between a first value of a feature of a pixel of a first representation of a scene and a second value of the feature of a corresponding pixel of a second representation of the scene; determining, for the first value, an aggregate based on the determined difference and at least one other value; and adjusting the feature of a pixel in an adjustment portion of at least one of the first representation or the second representation based on the aggregate value.

A system as described herein may comprise a processor; and memory coupled to the processor, the memory comprising executable instructions that, when executed by the processor, cause the processor to effectuate operations comprising: determining a difference between a first value of a feature of a pixel of a first representation of a scene and a second value of the feature of a corresponding pixel of a second representation of the scene; for the first value, determining an aggregate based on the determined difference and at least one other value; and adjusting the feature of an adjustment portion of at least one of the first representation or the second representation based on the aggregate value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Like reference numerals indicate like elements in the drawings. Elements are not drawn to scale unless otherwise indicated.

DETAILED DESCRIPTION

Figure 1:
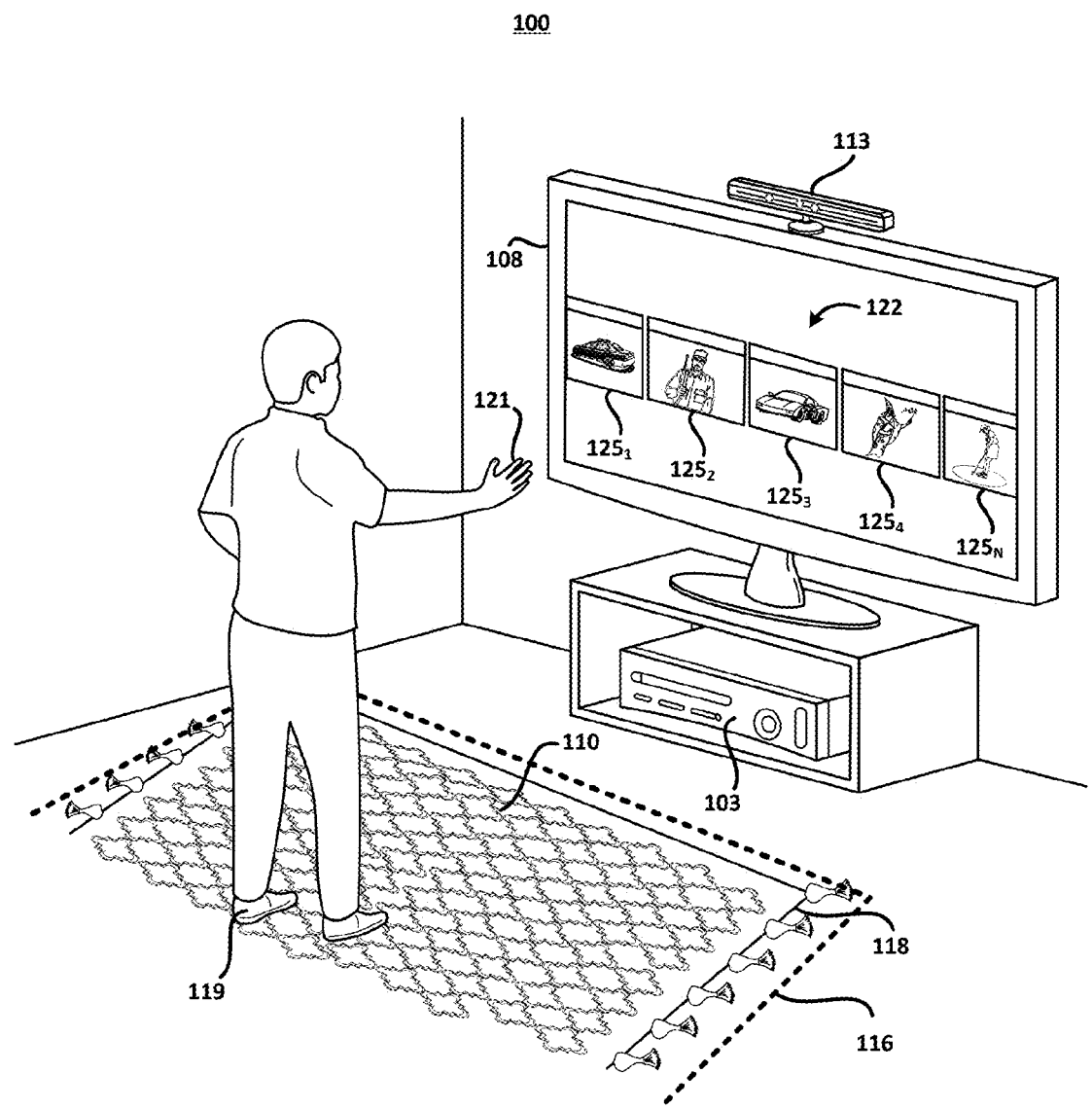
FIG. 1 and FIG. 2 depict an illustrative computing environment within which exposure adjustment compensation may be performed.

This disclosure provides a system and method to compensate for an unknown difference in exposure settings used to create two images stored on a computer. Many computer image processing, video processing, or computer vision algorithms that use two or more source frames of video will not work correctly, or not work as well, if all frames input to the algorithm were not captured with the same exposure settings. By first estimating the change due to adjustments in exposure settings, and then compensating for the adjustments, video processing algorithms can work effectively despite unknown changes to exposure settings.

Adjustments to exposure settings can be a common problem. In systems such as a video gaming system with a natural user interface (NUI) capture device (such as a KINECT image capturing device), the capture device will run for long periods of time, even hours, without stopping. Capture of quality digital images requires exposure adjustments to maximize the information stored in the limited number of bits per pixel recorded, and also to correct for differences in a sensor's characteristics and a display's characteristics. These adjustments include color balancing and gamma correction (at capture time, gamma correction is often called gamma encoding or compression). Over time the scene being captured will change. For example, the illumination of the scene may dim slowly as the sun sets, resulting in a slowing darkening scene. Or a small bright object may move toward the foreground to take up a large portion of the image, resulting in a scene with an overall average brightness increasing. Automatic exposure systems will change the exposure settings as the scene changes in an attempt to maximize the quality of the captured images. The exposure setting changes may not change continuously with the scene changes, but only once a threshold is reached, causing, for example, infrequent but sudden changes in exposure settings for a scene that changes continuously and slowly as a sun sets.

In some systems exposure compensation can be done directly. Where image capture components are well integrated into the video processing components, the actual exposure control process may be known by the video processing components, and the exposure control settings for each frame of video can be communicated (for example as metadata stored with every frame) from the capture components to the video processing components. In this case, video processing components that need to compare or otherwise process two images can compensate for any exposure adjustments using the exact exposure control settings and with the known exposure control process. However, in other systems, the exposure control process and/or the exposure settings used for any two images may not be known. Designs using the present disclosure provide a way to compensate for unknown exposure control differences between two or more images of the same scene.

Video is not a limiting example application of the methods disclosed here. While the methods disclosed here work with two (or more) images that are captured from a single camera at two different times (e.g. a video), methods described here may be applied to any two images of the same scene. For example, if two separate cameras take a photo of a scene at the same time from similar angles (and possibly with different exposure settings and even different exposure control processes), then designs based on this disclosure may help compensate for the exposure differences. A specific example of this would be a stereo camera system with automatic exposure systems operating independently for each camera. It should be understood that while the term frame sometimes implies one picture in a sequence of pictures taken over time (a video), references in this disclosure to frames may similarly be interpreted as any two images of the same scene, whether or not the images come from the same camera or from different times.

The first part of an exposure adjustment compensation is to estimate the change due to an adjustment in exposure settings between two input images. This can be done by comparing the pixel values of one pixel in the first frame and another pixel in the second frame, where both the pixels represent the same portion of the actual scene. Both pixels could represent, for example, the same spot on a rug on the floor of the scene in both pictures. Now, for example, if a pixel in a first frame has a red value of 10, and the pixel in the second frame corresponding to the same portion of the scene has a red value of 14, and both pixels represent the same spot on the rug which is presumably not changing color, then it can be assumed that an exposure adjustment has occurred causing the same red color in the actual scene to be stored as a 10 in the first frame and a 14 in the second frame.

In addition to red, this comparison (and subsequent adjustment) can be done for the green or blue value of a pixel for pixels represented by a red-green-blue (RGB) color space. Such comparisons can also be done with other pixel representations, including, as non-limiting examples, three other element color spaces such as luminance, red-difference chroma, blue-difference chroma (YCrCb), a four element color space such as cyan, magenta, yellow, key (CMYK), or a single element color space such as with a grayscale image. Comparison can also be done with pixel representations of non-visible light, such as a depth image (an image where the value of every pixel indicates the distance between an object in the scene and the sensor, described in more detail below), or an infrared (IR) image. Comparison and adjustments can be done on any numeric pixel representation, including representations for any type of light, visible or non-visible.

Estimates from multiple pixels can be combined to provide a better estimate of exposure setting adjustments. Digital representations of natural images generally always contain noise and some sort of average or aggregating of multiple estimates can provide a less noisy, or more reliable, estimate. Extending the above example where one pixel red value increased from 10 to 14 between the first frame and the second frame, there may be another pixel in the first frame also with a red value of 10, but whose corresponding pixel in the second frame has red value of 16. This other pixel provides an estimate of the effect of exposure changes to be 16−10=6 instead of 14−10=4, which was the change estimate from the first example pixel. These two estimates can be combined by averaging them, resulting in an average exposure change of (6+4)/2=5 for pixels of red value 10 in the first frame. Such averaging can be straight-forwardly extended, and perhaps reduce estimate noise, by averaging the exposure change of all pixels that start with a red value of 10 in the first frame. Other methods of aggregating estimate are also feasible, such as a weighted average, or a localized average that only aggregates nearby pixels.

Estimates can also be smoothed across different pixel values. For example, the estimated change to pixels with value 10 can be combined with neighboring pixel value estimates, such as values 5-9 and values 11-15. There are many ways to combine estimates across pixel values. For example, a low-pass filter could be applied, or averaging over a sliding window across pixel values could be done. Alternately, if a model of the exposure control process used by the capture system is known, for example if the capture system uses a specific non-linear gamma correction curve, then parameters of that curve could be fit to the estimates for different pixel values. Such smoothing techniques across pixel values may be particularly valuable when no estimates can be made for certain pixel values. For example, if there is no pixel in the first frame with a red value of 30, then the estimation process may not produce any estimate for the pixel red value of 30. A smoothing technique across pixel values after having created the estimate may solve this problem.

A mask can also improve the quality of estimates exposure adjustment effects by eliminating certain pixels from the estimation process. In particular, it can be helpful to mask off pixels that break assumptions of the estimation process. A first possible assumption is that the actual object has not changed color or brightness, so that any change in pixel value is due only to exposure adjustments. If an object changes color, for example a television screen, this assumption will be broken.

Another assumption relates to the need to identify, for a given pixel in a first frame, which pixel in a second frame represents the same piece of the actual scene, for example the same spot on a rug. If the two source images were taken using the same camera mounted in a fixed position (as may be the case with an video sensor for a natural user interface attached to a computer or multimedia gaming device), a reasonable assumption is that the corresponding second pixel will simply be the pixel that is in the same location within the second frame as the pixel in the first frame. For example the pixel in the third row, second column of the first frame corresponds to the pixel in the third row, second column of the second frame. If an object that a pixel represents moves between the two frames, this assumption will be broken.

Estimates can be improved by identifying pixels that break these or other assumptions of the estimate process, and then masking those pixels out (not including them) in the estimation process. Many methods can be used to determine which pixels to exclude or mask off. For example, if the system includes a natural user interface that identifies humans and tracks moving objects, objects that are likely to be changing or moving may be already identified by the natural user interface. Pixels corresponding to those changing or moving objects can then be masked off during the estimation process. Another technique for generating masks includes using optical flow or other computer vision techniques to identify motion in the image masking those pixels out. Or another technique for generating masks is to simply set up a threshold for maximum threshold for pixel value delta, such that if the difference in value between corresponding pixels is above the threshold, that pixel is masked off and not included in determining the aggregate difference.

Moving objects may have masks that move between frames. Since a pixel from both frames may be required, the exclusion mask for both frames may be considered. One way to do this is to logically OR the two masks together, assuming the masks are represented as a binary image with 1=exclude a pixel, and 0=include a pixel in the estimation calculation. The result is that only pixels that fall outside the mask in both frames will be used as input to estimate the exposure adjustment effect.

Other designs may track moving objects, and instead of simply masking out such objects, the motion estimates can be used to compensate for the motion by determining which pixels in a first frame correspond to which pixels in the second frame. What is important for pixel correspondence is not that the pixels are in the sample place in the frame of the image, but rather that the pixels represent the same spot of an object in the scene. So if, for example, a ball is moving across a scene, instead of masking off the ball, motion information generated, for example, by a natural user interface could be used to determine which pixels in the first frame correspond to which pixels in the second frame while estimating the exposure adjustment effect.

Tracking of object locations can also be used in designs where two different cameras produce the two source images, or where a single camera is not fixed but moves, capturing the two images. Anything from a simple global motion vector to a complex warping and masking can be used to register objects between the two source frames. Such a motion vector or warping can be used to determine which pixels in the first frame get paired with (correspond to) which pixels in a second frame.

After an estimate is made, it can be applied to either source image before finally doing the desired video processing operation. An estimate of exposure adjustment effects can indicate, for every possible first source frame value or color, what the value of color in the second source frame should be. A design with such a mapping of input color values to output color values is a look-up table, sometimes called a color look-up table (CLUT). A design with an effect estimate is in the form of a look-up table with entries indicating the change from the first frame to the second frame. Such a look-up table can be applied to the first frame. This results in a compensated first frame that can then be used with the original second frame in any subsequent processing operation. Alternately, the inverse look-up table, whose entries indicate a first frame pixel value given a second frame pixel value, can be applied to the second frame instead of the first.

In some implementations, the estimate need not be applied to an entire image (either first or second), but only a portion of an image. In some cases the portion that the estimate is applied to may be only a portion that was masked off while creating the estimate.

Implementations are not limited to two source frames. Image or video processing operations that require more than two input frames may require exposure adjustment compensation for all input frames. In this case, an implementation may include separately estimating the exposure adjustment effect between a single reference frame and all other frames, and then applying the separate estimates to the other frames separately, compensating them all to correspond back to the exposure settings of the reference frame. A multi-frame video processing operation can then be applied to the entire group of images (sometime called a group of pictures, or GOP).

The image or video processing operations that can follow a correction for exposure adjustment are quite varied. Many computer vision and machine types of operations require more than one input frame and can benefit from the exposure adjustment correction or compensation. Example categories of computer vision operations include video tracking, object recognition, motion estimation, and image restoration. A computer with a natural user interface which uses one or more cameras to detect human body parts or small physical gestures is a more specific application of some computer vision or machine vision operations. A natural user interface system with a light sensing device such as XBOX KINECT can use video processing operations to measure a person's heart rate with only a video image of their face by tracking very slight changes in the color of the skin that correspond to the beats of the person's heart. Measuring such small changes in coloring requires a very stable image of the person's face, and changes in the face due to exposure correction are problematic. Measuring a person's heart rate via a video camera is a specific example of video processing that can be improved with implementations for compensation of exposure adjustments.

Turning to the drawings, FIG. 1 shows an illustrative computing environment 100 in which the present exposure adjustment compensation may be implemented. It is emphasized that the environment 100 is intended to be illustrative and that other environments which include other types of devices, applications, and usage scenarios may also be able to use the principles described herein. The environment 100 includes a computing platform such as multimedia console 103 that is typically configured for running gaming and non-gaming applications using local and/or networked programming and content, playing pre-recorded multimedia such as optical discs including DVDs (Digital Versatile Discs) and CDs (Compact Discs), streaming multimedia from a network, participating in social media, browsing the Internet and other networked media and content, or the like using a coupled audio/visual display 108, such as a television.

The multimedia console 103 in this example is operatively coupled to a capture device 113 which may be implemented using one or more video cameras that are configured to visually monitor a physical space 116 (indicated generally by the dashed line in FIG. 1) that is occupied by a user 119 standing on a rug 118. As described below in more detail, the capture device 113 is configured to capture, track, and analyze the movements and/or gestures of the user 119 so that they can be used as controls that may be employed to affect, for example, an application or an operating system running on the multimedia console 103. Various motions of the hands 121 or other body parts of the user 119 may correspond to common system wide tasks such as selecting a game or other application from a main user interface. The capture device 113 is also configured to capture any objects in the scene comprising the physical space 116 other than the user 119, such as the rug 118, and the spot 110 on the rug 118.

For example as shown in FIG. 1, the user 119 can navigate among selectable objects 122 that include various icons $125_{1-N}$ that are shown on the coupled display 108, browse through items in a hierarchical menu, open a file, close a file, save a file, or the like. In addition, the user 119 may use movements and/or gestures to end, pause, or save a game, select a level, view high scores, communicate with a friend, etc. Virtually any controllable aspect of an operating system and/or application may be controlled by movements of the user 119. A full range of motion of the user 119 may be available, used, and analyzed in any suitable manner to interact with an application or operating system that executes in the environment 100.

Figure 2:
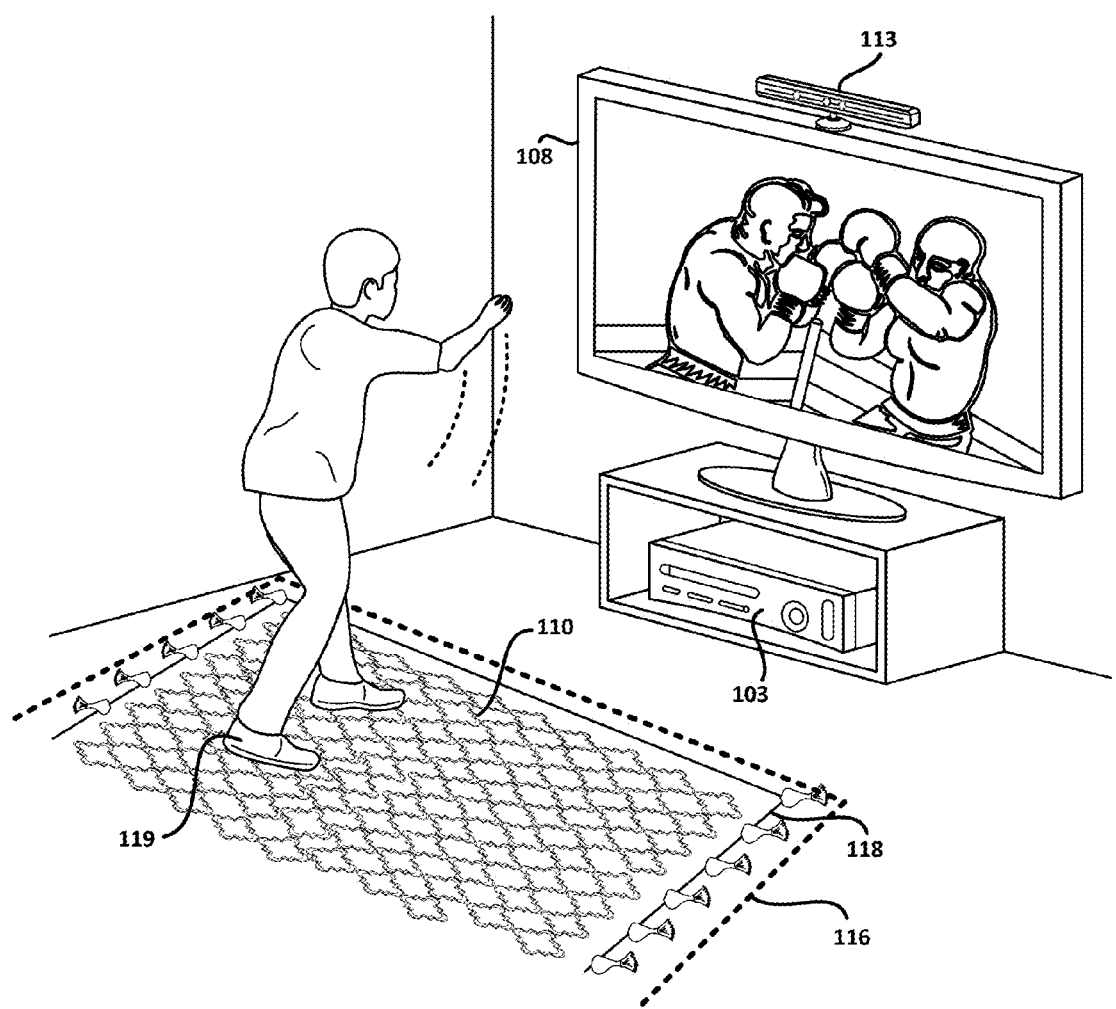

The capture device 113 can also be used to capture, track, and analyze movements by the user 119 to control gameplay as a gaming application executes on the multimedia console 103. For example, as shown in FIG. 2, a gaming application such as a boxing game uses the display 108 to provide a visual representation of a boxing opponent to the user 119 as well as a visual representation of a player avatar that the user 119 may control with his or her movements. The user 119 may make movements (e.g., throwing a punch) in the physical space 116 to cause the player avatar to make a corresponding movement in the game space. Movements of the user 119 may be recognized and analyzed in the physical space 116 such that corresponding movements for game control of the player avatar in the game space are performed.

Gaming applications supported by the multimedia console 103 provide an exemplary context in which the present exposure adjustment compensation may be advantageously utilized. For example, in the boxing game discussed above, a game designer may wish to add a game feature in which a user's heartrate is monitored along with other factors (such as number of punches thrown and landed per round) as an indication of the user's performance, skill, or fitness level. It will be further appreciated that heartrate tracking may be useful in other contexts including both gaming and non-gaming contexts. As discussed above, heartrate tracking can be improved with exposure adjustment compensation. Additionally, many of the natural user interface functions for tracking and detecting user 119 for boxing game input may be improved by exposure adjustment compensation.

Figure 3:
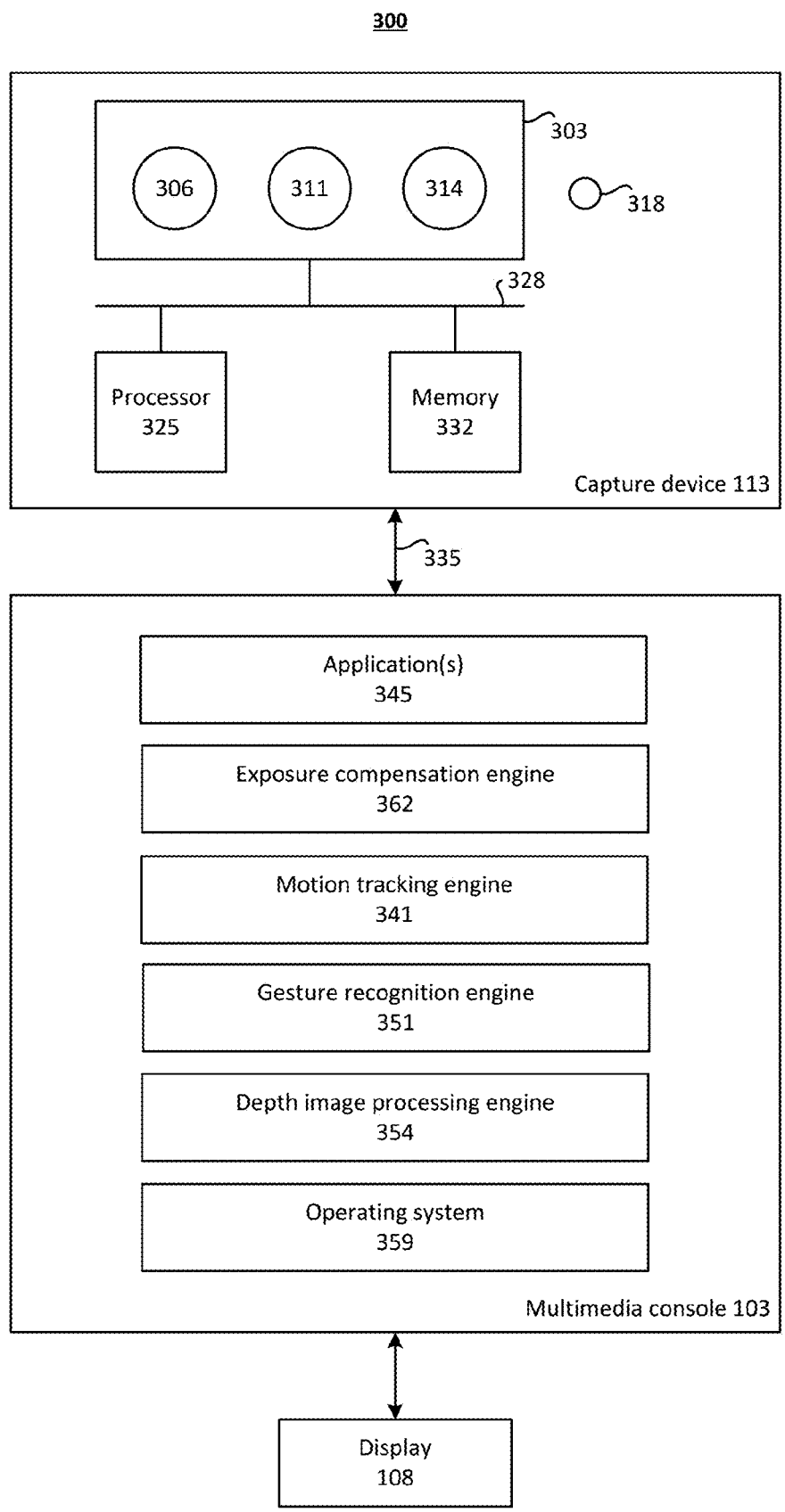
FIG. 3 depicts an illustrative capture device that may be used in part to implement exposure adjustment compensation.

FIG. 3 shows illustrative functional components of the capture device 113 that may be used as part of a target recognition, analysis, and tracking system 300 to recognize human and non-human targets in a capture area of the physical space 116 (FIG. 1) without the use of special sensing devices attached to the subjects, uniquely identify them, and track them in three-dimensional space. System 300 may provide input to or a part of a natural user interface system. The capture device 113 may be configured to capture video with depth information including a depth image that may include depth values via any suitable technique including, for example, time-of-flight, structured light, stereo image, or the like. In some implementations, the capture device 113 may organize the calculated depth information into "Z layers," or layers that may be perpendicular to a Z-axis extending from the depth camera along its line of sight.

As shown in FIG. 3, the capture device 113 includes an image camera component 303. The image camera component 303 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, the image camera component 303 includes an IR light component 306, an IR camera 311, and a visible light RGB camera 314.

Various techniques may be used to capture depth video frames. For example, in time-of-flight analysis, the IR light component 306 of the capture device 113 may emit an infrared light onto the capture area and may then detect the backscattered light from the surface of one or more targets and objects in the capture area using, for example, the IR camera 311 and/or the RGB camera 314. In some implementations, pulsed infrared light may be used such that the time between an outgoing light pulse and a corresponding incoming light pulse may be measured and used to determine a physical distance from the capture device 113 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects. Time-of-flight analysis may be used to indirectly determine a physical distance from the capture device 113 to a particular location on the targets or objects by analyzing the intensity of the reflected beam of light over time via various techniques including, for example, shuttered light pulse imaging.

In other implementations, the capture device 113 may use structured light to capture depth information. In such an analysis, patterned light (i.e., light displayed as a known pattern such as a grid pattern or a stripe pattern) may be projected onto the capture area via, for example, the IR light component 306. Upon striking the surface of one or more targets or objects in the capture area, the pattern may become deformed in response. Such a deformation of the pattern may be captured by, for example, by the IR camera 311 and/or the RGB camera 314 and may then be analyzed to determine a physical distance from the capture device to a particular location on the targets or objects.

The capture device 113 may use two or more physically separated cameras that may view a capture area from different angles, to obtain visual stereo data that may be resolved to generate depth information. Other types of depth image arrangements using single or multiple cameras can also be used to create a depth image. The capture device 113 may further include a microphone 318. The microphone 318 may include a transducer or sensor that may receive and convert sound into an electrical signal. The microphone 318 may be used to reduce feedback between the capture device 113 and the multimedia console 103 in the target recognition, analysis, and tracking system 300. Additionally, the microphone 318 may be used to receive audio signals that may also be provided by the user 119 to control applications such as game applications, non-game applications, or the like that may be executed by the multimedia console 103.

The capture device 113 may further include a processor 325 that may be in operative communication with the image camera component 303 over a bus 328. The processor 325 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The capture device 113 may further include a memory component 332 that may store the instructions that may be executed by the processor 325, images or frames of images captured by the cameras, user profiles or any other suitable information, images, or the like. According to one example, the memory component 332 may include random access memory (RAM), read only memory (ROM), cache, Flash memory, a hard disk, or any other suitable storage component. As shown in FIG. 3, the memory component 332 may be a separate component in communication with the image capture component 303 and the processor 325. Alternatively, the memory component 332 may be integrated into the processor 325 and/or the image capture component 303. In one implementation, some or all of the components 303, 306, 311, 314, 318, 325, 328, and 332 of the capture device 113 are located in a single housing.

The capture device 113 operatively communicates with the multimedia console 103 over a communication link 335. The communication link 335 may be a wired connection including, for example, a USB (Universal Serial Bus) connection, a Firewire connection, an Ethernet cable connection, or the like and/or a wireless connection such as a wireless 802.11 connection. The multimedia console 103 can provide a clock to the capture device 113 that may be used to determine when to capture, for example, a scene via the communication link 335. The capture device 113 may provide the depth information and images captured by, for example, the IR camera 311 and/or the RGB camera 314, including a skeletal model and/or facial tracking model that may be generated by the capture device 113, to the multimedia console 103 via the communication link 335. The multimedia console 103 may then use the skeletal and/or facial tracking models, depth information, and captured images to, for example, create a virtual screen, adapt the user interface, and control an application.

A motion tracking engine 341 uses the skeletal and/or facial tracking models and the depth information to provide a control output to one or more applications (representatively indicated by an application 345 in FIG. 3) running on the multimedia console 103 to which the capture device 113 is coupled. The information may also be used by a gesture recognition engine 351, depth image processing engine 354, operating system 359, and/or exposure adjustment compensation engine 362. The depth image processing engine 354 uses the depth images to track motion of objects, such as the user and other objects. The depth image processing engine 354 will typically report to operating system 359 an identification of each object detected and the location of the object for each frame. The operating system 359 can use that information to update the position or movement of an avatar, for example, or other images shown on the display 108, or to perform an action on the user interface.

The gesture recognition engine 351 may use a gestures library (not shown) that can include a collection of gesture filters, each comprising information concerning a gesture that may be performed, for example, by a skeletal model (as the user moves). The gesture recognition engine 351 may compare the frames captured by the capture device 113 in the form of the skeletal model and movements associated with it to the gesture filters in the gesture library to identify when a user (as represented by the skeletal model) has performed one or more gestures. Those gestures may be associated with various controls of an application. Thus, the multimedia console 103 may employ the gestures library to interpret movements of the skeletal model and to control an operating system or an application running on the multimedia console based on the movements.

Figure 4:
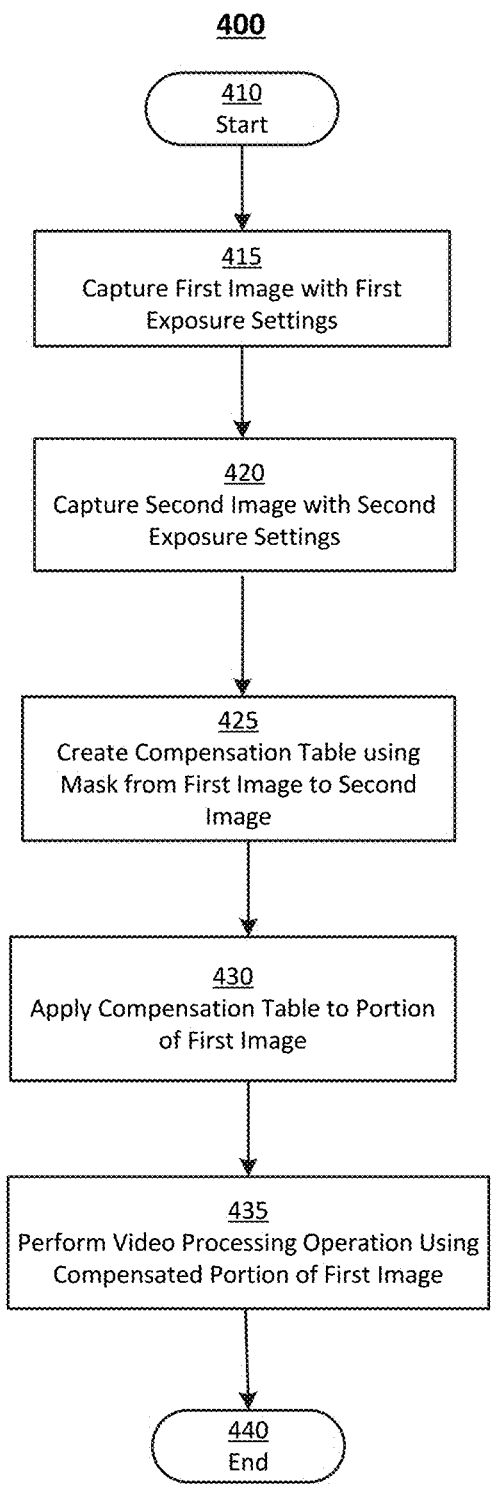
FIG. 4 is a flowchart of an illustrative overview of an exposure adjustment compensation.

FIG. 4 is a flowchart of an illustrative overview of an exposure adjustment compensation. Process 400 is an illustrative example of a possible implementation of exposure compensation engine 362 of FIG. 3. The process 400 starts with capturing a first image 415 using a first set of exposure settings, and capturing a second image 420 using a second set of exposure settings. If the input is a video, the second frame will be captured at some point after the first frame but the frames need not be sequential. In an alternate implementation, as described above, the two input frames need not be from a video or from the same camera or from different capture times, and instead may be captured at the same time using two different cameras.

Figure 5:
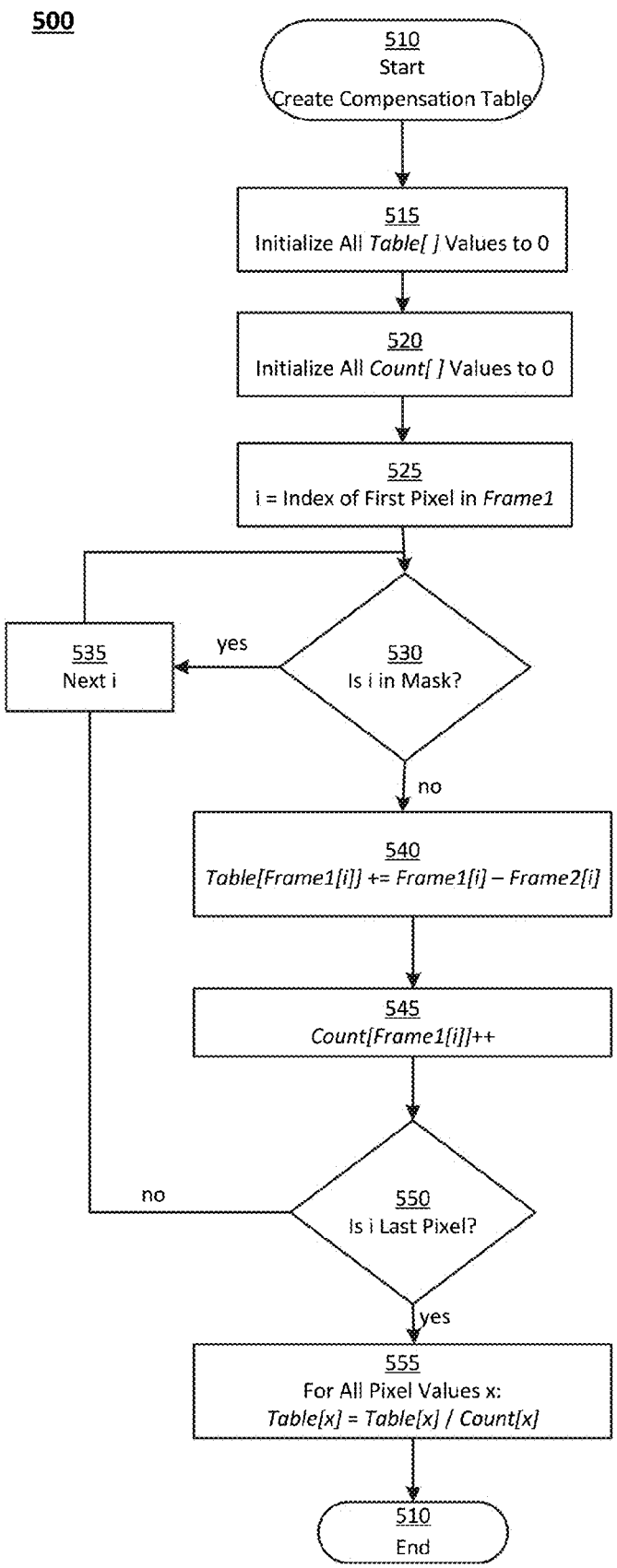
FIG. 5 is a flowchart illustrative of the Create Compensation Table step of FIG. 4.
Figure 6:
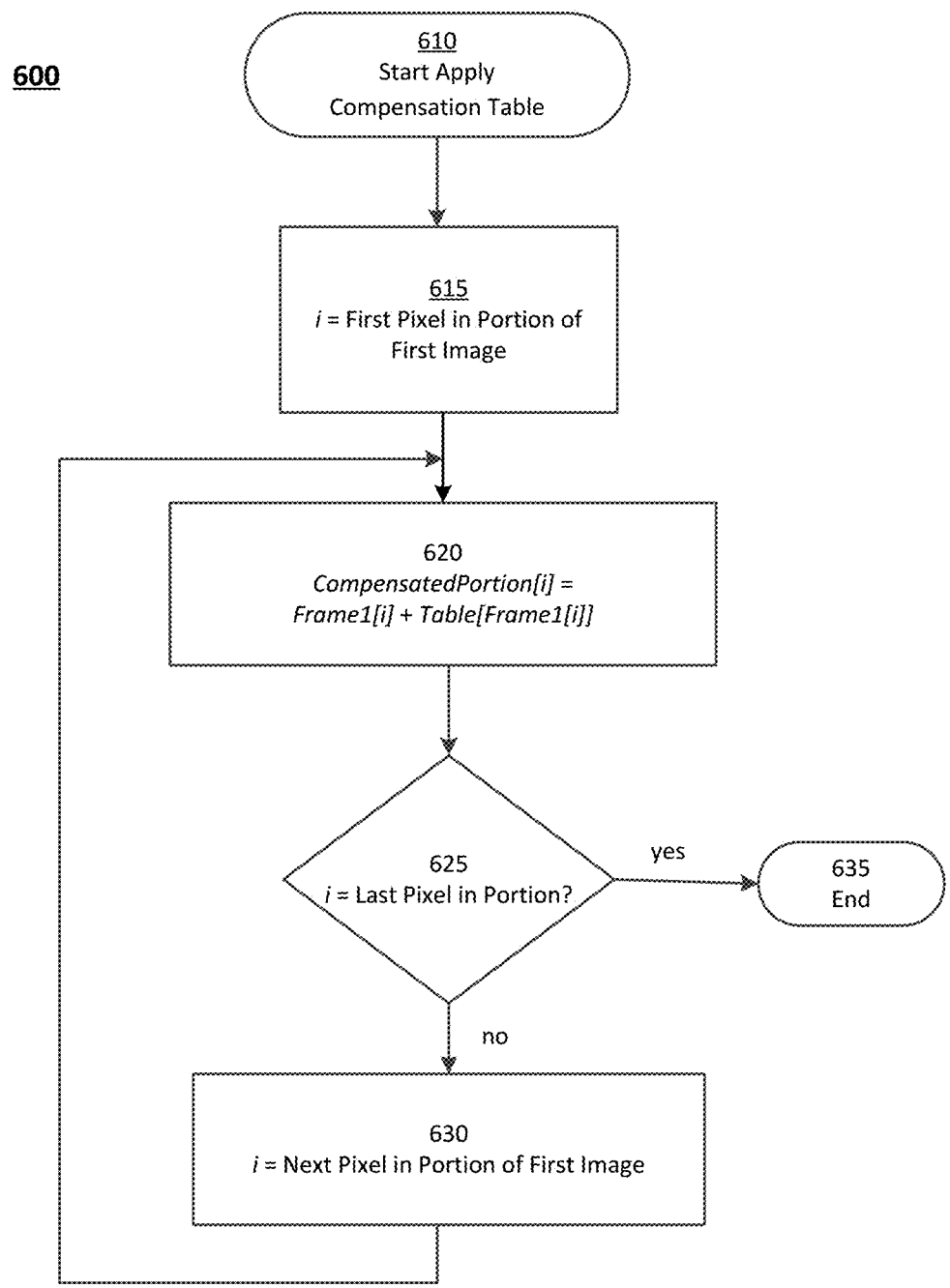
FIG. 6 is a flowchart illustrative of the Apply Compensation Table step of FIG. 4.

A compensation table is created in 425 using a mask and the two captured images. An example process for this is illustrated in FIG. 5. The design of FIG. 4 assumes the compensation table is intended to compensate the first image (or a portion thereof) to create a version of the first image that would be as though the first image were captured with the exposure settings of the second image. Accordingly, in 430, the compensation table is applied to a portion of the first image. The portion used is the portion desired to perform a video processing operation in step 435. An example process for this is illustrated in FIG. 6. As discussed above, an alternate implementation includes a table that is the inverse of this compensation table, and would be used to create a version of the second image as though it had been captured with the first image's exposure settings.

Finally, a video processing operation is performed in 435 using the second image and the compensated portion of the first image. Process 400 ends at 440.

FIG. 5 is a flowchart illustrative of the Create Compensation Table step of FIG. 4. The process 500 starts in 510, and values are initialized to 0 for all elements of the Table[ ] array and a Count[ ] array. The sizes of the Table[ ] and Count[ ] arrays are the same, and in this implementation the array sizes are equal to the number of pixel values for the input images. For example, if the pixel values being considered are represented by eight-bit numbers, the array sizes will be 256.

Steps 525 to 550 are a loop over all pixels in the first frame. At step 525, the loop variable i is initialized correspond to the first pixel in the first frame. As described above, a mask is used to eliminate the pixels in the first frame that are likely due to a poor basis for estimating the compensation table. The mask may include moving objects, and may include the portion of the images for which a video processing operation is to be applied in step 435 of FIG. 4. The masking happens in step 530 by testing if the pixel indicated by loop variable i is in the mask. If it is in the mask, then the loop moves immediately to the next i (the next pixel) in step 535. If i is not in the mask, the current pixel i is used for estimating the compensation table in steps 540 and 545. In step 540, the Table[ ] entry for the value of pixel i of the first frame is incremented by the amount of difference between the value of pixel i in the first frame and the second frame. This implementation assumes, for example, a static camera and a static scene outside the masked area, such that the $i^{th}$ pixel location in first frame represents the same part of the captured scene as the $i^{th}$ pixel location in the second frame. In step 545, a count is incremented corresponding to Table[ ] entry that was modified. In step 550, if i is not the last pixel in the first frame, the loop continues to step 535. After looping through all pixels in the first frame, in step 555 all Table[ ] entries are normalized by the number of pixel differences that were added to each. The end result should be a Table[ ] array with every entry being an average pixel value difference for each pixel value in frame one (outside the mask).

FIG. 6 is a flowchart illustrative of the Apply Compensation Table step of FIG. 4. The process 600 starts at 610. The entire process is a loop, including steps 615-630, through all the pixels in the portion of interest of the first image. The portion of interest is the portion of frame one for which the video processing operation of step 435 in FIG. 4 is to be applied. In step 615, loop variable i is initialized to the first pixel in the portion. Then in step 620, for every pixel i, the compensated portion image is determined to be the value of that pixel in first frame plus the compensation table entry for that first frame pixel value. The compensation table (Table[ ] in the FIG. 6), is the table created in FIG. 5. Finally, if i has reached the end of the portion of interest, process 600 ends at 635, otherwise i is incremented to the next pixel in the portion in step 630.

Figure 7:
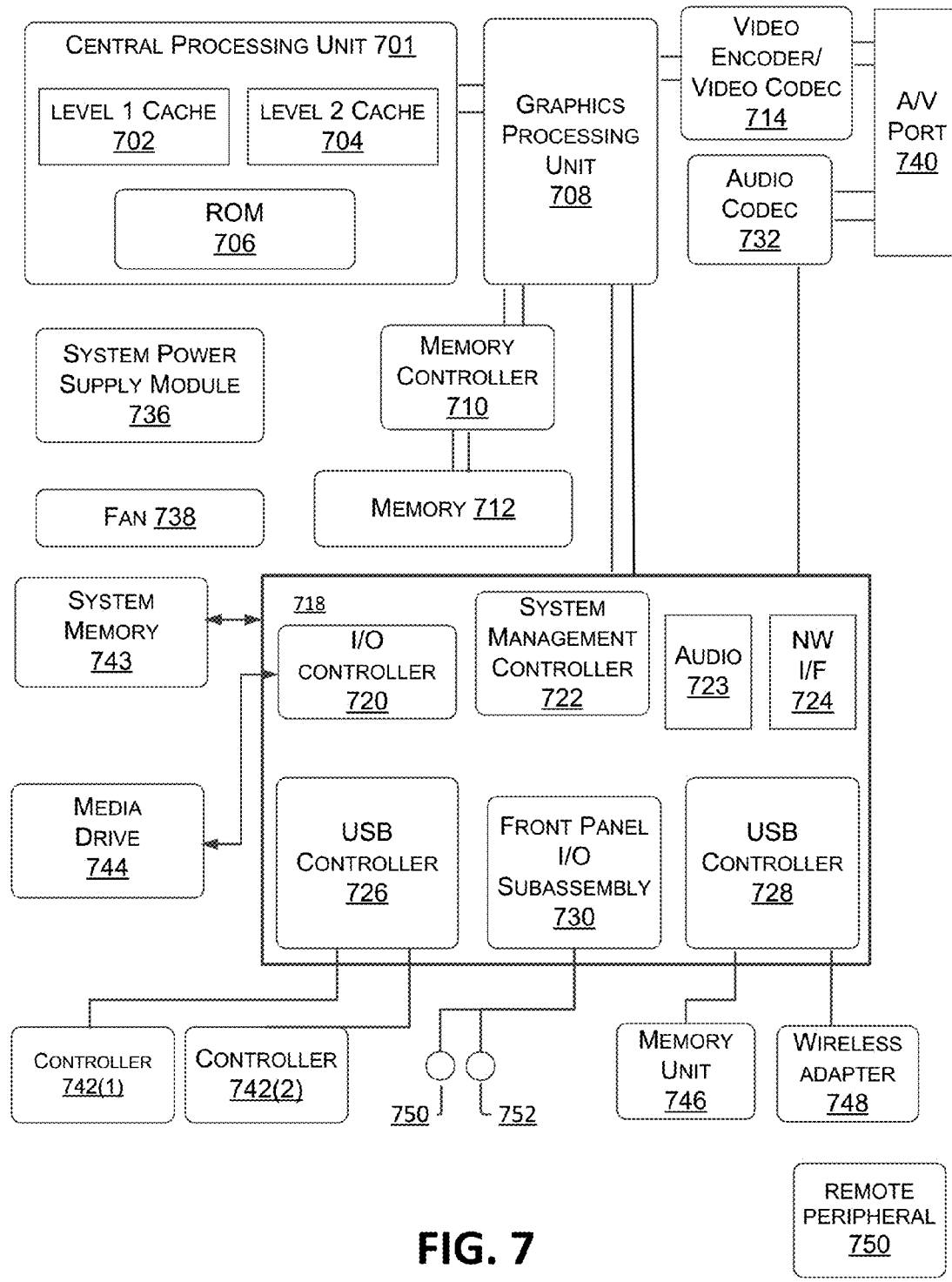
FIG. 7 illustrates an example of a computing system that may be the multimedia console 103 shown in FIGS. 1-3.

FIG. 7 illustrates an example implementation of a computing system that may be the multimedia console 103 shown in FIGS. 1-3 used to implement an exposure adjustment compensation and to track motion and/or animate (or otherwise update) an avatar or other on-screen object displayed by an application. The computing system such as the multimedia console 103 described above with respect to FIGS. 1-2 may be a multimedia console, such as a gaming console. As shown in FIG. 7, the multimedia console 700 has a central processing unit (CPU) 701 having a level 1 cache 702, a level 2 cache 704, and a flash ROM (Read Only Memory) 706. The level 1 cache 702 and a level 2 cache 704 temporarily store data and hence reduce the number of memory access cycles, thereby improving processing speed and throughput. The CPU 701 may be provided having more than one core, and thus, additional level 1 and level 2 caches 702 and 704. The flash ROM 706 may store executable code that is loaded during an initial phase of a boot process when the multimedia console 700 is powered ON.

A graphics processing unit (GPU) 708 and a video encoder/video codec (coder/decoder) 714 form a video processing pipeline for high speed and high resolution graphics processing. Data is carried from the graphics processing unit 708 to the video encoder/video codec 714 via a bus. The video processing pipeline outputs data to an A/V (audio/video) port 740 for transmission to a television or other display. A memory controller 710 is connected to the GPU 708 to facilitate processor access to various types of memory 712, such as, but not limited to, a RAM (Random Access Memory).

The multimedia console 700 includes an I/O controller 720, a system management controller 722, an audio processing unit 723, a network interface 724, a first USB host controller 726, a second USB controller 728 and a front panel I/O subassembly 730 that are preferably implemented on a module 718. The USB controllers 726 and 728 serve as hosts for peripheral controllers 742(1)-742(2), a wireless adapter 748, and an external memory device 746 (e.g., flash memory, external CD/DVD ROM drive, removable media, etc.). The network interface 724 and/or wireless adapter 748 provide access to a network (e.g., the Internet, home network, etc.) and may be any of a wide variety of various wired or wireless adapter components including an Ethernet card, a modem, a Bluetooth module, a cable modem, and the like.

System memory 743 is provided to store application data that is loaded during the boot process. A media drive 744 is provided and may comprise a DVD/CD drive, Blu-Ray drive, hard disk drive, or other removable media drive, etc. The media drive 744 may be internal or external to the multimedia console 700. Application data may be accessed via the media drive 744 for execution, playback, etc. by the multimedia console 700. The media drive 744 is connected to the I/O controller 720 via a bus, such as a Serial ATA bus or other high speed connection (e.g., IEEE 1394).

The system management controller 722 provides a variety of service functions related to assuring availability of the multimedia console 700. The audio processing unit 723 and an audio codec 732 form a corresponding audio processing pipeline with high fidelity and stereo processing. Audio data is carried between the audio processing unit 723 and the audio codec 732 via a communication link. The audio processing pipeline outputs data to the AN port 740 for reproduction by an external audio player or device having audio capabilities.

The front panel I/O subassembly 730 supports the functionality of the power button 750 and the eject button 752, as well as any LEDs (light emitting diodes) or other indicators exposed on the outer surface of the multimedia console 700. A system power supply module 736 provides power to the components of the multimedia console 700. A fan 738 cools the circuitry within the multimedia console 700.

The CPU 701, GPU 708, memory controller 710, and various other components within the multimedia console 700 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 700 is powered ON, application data may be loaded from the system memory 743 into memory 712 and/or caches 702, 704 and executed on the CPU 701. The application may present a graphical user interface that provides a consistent user experience when navigating to different media types available on the multimedia console 700. In operation, applications and/or other media contained within the media drive 744 may be launched or played from the media drive 744 to provide additional functionalities to the multimedia console 700.

The multimedia console 700 may be operated as a standalone system by simply connecting the system to a television or other display. In this standalone mode, the multimedia console 700 allows one or more users to interact with the system, watch movies, or listen to music. However, with the integration of broadband connectivity made available through the network interface 724 or the wireless adapter 748, the multimedia console 700 may further be operated as a participant in a larger network community.

When the multimedia console 700 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 700 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 701 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 742(1) and 742(2)) are shared by gaming applications and system applications. The input devices are not reserved resources, but are to be switched between system applications and the gaming application such that each will have a focus of the device. The application manager preferably controls the switching of input stream, without the gaming application's knowledge and a driver maintains state information regarding focus switches. The cameras 226, 228 and capture device 120 may define additional input devices for the console 700 via USB controller 726 or other interface.

Figure 8:
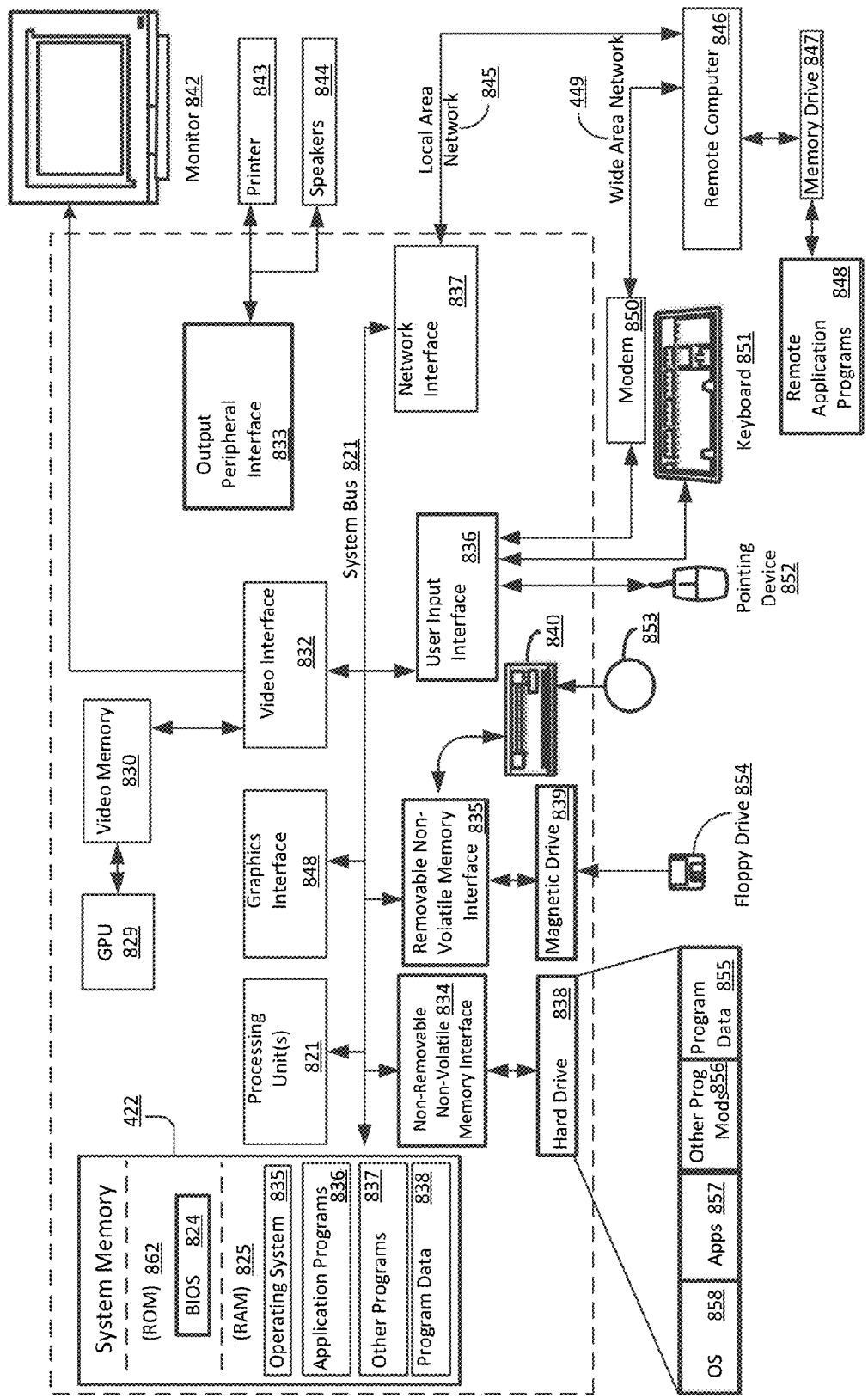
FIG. 8 illustrates another example of a computing system that may be the multimedia console 103 shown in FIGS. 1-3.

FIG. 8 illustrates another example of a computing system 820 that may be the multimedia console 103 shown in FIGS. 1-3 used to implement an exposure adjustment compensation and to track motion and/or animate (or otherwise update) an avatar or other on-screen object displayed by an application. The computing system 820 is only one example of a suitable computing system and is not intended to suggest any limitation as to the scope of use or functionality of the presently disclosed subject matter. Neither should the computing system 820 be interpreted as having any dependency or requirement relating to any one or combination of components illustrated in the exemplary computing system 820. In some implementations the various depicted computing elements may include circuitry configured to instantiate specific aspects of the present disclosure. For example, the term circuitry used in the disclosure can include specialized hardware components configured to perform function(s) by firmware or switches. In other example implementations the term circuitry can include a general purpose processing unit, memory, etc., configured by software instructions that embody logic operable to perform function(s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In addition, functionally described herein as software can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Computing system 820 comprises a computer 841, which typically includes a variety of computer readable media. Computer readable media can be any available media that can be accessed by computer 841 and includes both volatile and nonvolatile media, removable and non-removable media. The system memory 822 includes computer storage media in the form of volatile and/or nonvolatile memory such as read only memory (ROM) 823 and random access memory (RAM) 460. A basic input/output system 824 (BIOS), containing the basic routines that help to transfer information between elements within computer 841, such as during start-up, is typically stored in ROM 823. RAM 460 typically contains data and/or program modules that are immediately accessible to and/or presently being operated on by processing unit 859. By way of example and not limitation, FIG. 4 illustrates operating system 825, application programs 826, other program modules 827, and program data 828.

The computer 841 may also include other removable/non-removable, volatile/nonvolatile computer storage media. By way of example only, FIG. 8 illustrates a hard disk drive 838 that reads from or writes to non-removable, nonvolatile magnetic media, a magnetic disk drive 839 that reads from or writes to a removable, nonvolatile magnetic disk 854, and an optical disk drive 840 that reads from or writes to a removable, nonvolatile optical disk 853 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 838 is typically connected to the system bus 821 through a nonremovable memory interface such as interface 834, and magnetic disk drive 839 and optical disk drive 840 are typically connected to the system bus 821 by a removable memory interface, such as interface 835.

The drives and their associated computer storage media discussed above and illustrated in FIG. 8, provide storage of computer readable instructions, data structures, program modules, and other data for the computer 841. In FIG. 8, for example, hard disk drive 838 is illustrated as storing operating system 858, application programs 857, other program modules 856, and program data 855. Note that these components can either be the same as or different from operating system 825, application programs 826, other program modules 827, and program data 828. Operating system 858, application programs 857, other program modules 856, and program data 855 are given different numbers here to illustrate that, at a minimum, they are different copies. A user may enter commands and information into the computer 841 through input devices such as a keyboard 851 and pointing device 852, commonly referred to as a mouse, trackball, or touch pad. Other input devices (not shown) may include a microphone, joystick, game pad, satellite dish, scanner, or the like. These and other input devices are often connected to the processing unit 859 through a user input interface 836 that is coupled to the system bus, but may be connected by other interface and bus structures, such as a parallel port, game port or a universal serial bus (USB). The cameras 226, 228 and capture device 120 may define additional input devices for the computing system 820 that connect via user input interface 836. A monitor 842 or other type of display device is also connected to the system bus 821 via an interface, such as a video interface 832. In addition to the monitor, computers may also include other peripheral output devices such as speakers 844 and printer 843, which may be connected through an output peripheral interface 833. Capture device 120 may connect to computing system 820 via output peripheral interface 833, network interface 837, or other interface.

Note that memory or storage, discussed in relation to FIGS. 7 and 8 or elsewhere in this disclosure, may comprise a storage medium having a concrete, tangible, physical structure. As is known, a signal does not have a concrete, tangible, physical structure. Memory, as well as any computer-readable storage medium described herein, is not to be construed as a signal. The memory, as well as any computer-readable storage medium described herein, is not to be construed as a transient signal. The memory, as well as any computer-readable storage medium described herein, is not to be construed as a propagating signal. The memory, as well as any computer-readable storage medium described herein, is to be construed as an article of manufacture having a concrete, tangible, physical structure.

The computer 841 may operate in a networked environment using logical connections to one or more remote computers, such as a remote computer 846. The remote computer 846 may be a personal computer, a server, a router, a network PC, a peer device, or other common network node, and typically includes many or all of the elements described above relative to the computer 841, although only a memory storage device 847 has been illustrated in FIG. 4. The logical connections depicted include a local area network (LAN) 845 and a wide area network (WAN) 849, but may also include other networks. Such networking environments are commonplace in offices, enterprise-wide computer networks, intranets and the Internet.

When used in a LAN networking environment, the computer 841 is connected to the LAN 845 through a network interface 837. When used in a WAN networking environment, the computer 841 typically includes a modem 850 or other means for establishing communications over the WAN 849, such as the Internet. The modem 850, which may be internal or external, may be connected to the system bus 821 via the user input interface 836, or other appropriate mechanism. In a networked environment, program modules depicted relative to the computer 841, or portions thereof, may be stored in the remote memory storage device. By way of example, and not limitation, FIG. 4 illustrates application programs 848 as residing on memory device 847. It will be appreciated that the network connections shown are exemplary and other means of establishing a communications link between the computers may be used.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

An example apparatus may comprise a processor; and memory coupled to the processor, the memory comprising executable instructions that, when executed by the processor, cause the processor to effectuate operations comprising: generating a masked reference image by applying a mask to a reference image, the masked reference image comprising a plurality of pixels; generating estimates of compensation for pixel values contained in the masked reference image, wherein the estimate for a particular pixel value is an aggregate of pixel value differences, for pixels with the particular pixel value in the masked reference image, between the pixel values of corresponding pixels in a second image and the particular pixel value, wherein a pixel in the reference image corresponds to a pixel in the second image when pixels represent the same part of a scene; and generating a compensated image portion by applying the estimate to a compensation portion of the reference image by, wherein every pixel in the compensated image portion is generated by adding the value of the corresponding pixel in the reference image to the estimate for that corresponding pixel value.

Another example apparatus is the above apparatus with the operations further comprising generating the mask by logically ORing a binary mask for the reference image with a binary mask for the second image.

Another example apparatus is the above apparatus with the operations further comprising performing a video processing operation on the compensated image portion and a portion of the second image corresponding to the compensation portion.

Another example apparatus is the above apparatus with the operations further comprising constructing the mask by including in the mask at least one of: a portion of the images that are moving, and the compensation portion.

Another example apparatus is the above apparatus wherein the video processing operation detects the heartrate of a human object in the reference image and the second image.

Another example apparatus is the above apparatus wherein the aggregate of pixel value differences is determined by averaging the pixel value differences.

Another example apparatus is the above apparatus wherein the pixel values represent at least one of: red, green, blue, luminance, red-difference chroma, blue-difference chroma, or infrared, or other part of the light spectrum.

An example method may comprise determining a difference between a first value of a feature of a pixel of a first representation of a scene and a second value of the feature of a corresponding pixel of a second representation of the scene; determining, for the first value, an aggregate based on the determined difference and at least one other value; and adjusting the feature of a pixel in an adjustment portion of at least one of the first representation or the second representation based on the aggregate value.

Another example method is the above method further comprising excluding a pixel from the aggregate if the pixel is contained in a mask.

Another example method is the above method further comprising constructing the mask by logically ORing a binary mask for the first representation with a binary mask for the second representation.

Another example method is the above method further comprising constructing the mask by including in the mask at least one of: a portion of the representations that are moving, and the adjustment portion.

Another example method is the above method, further comprising performing a video processing operation on the adjusted adjustment portion and a corresponding portion of another representation, wherein the video processing operation detects the heartrate of a human object in the first representation and the second representation.

Another example method is the above method further comprising determining the aggregate by averaging a set of determined differences, wherein the set includes pixels from a reference frame having the same first value of the feature, and wherein the reference frame is either the first representation or the second representation.

An example system may comprise a processor; and memory coupled to the processor, the memory comprising executable instructions that, when executed by the processor, cause the processor to effectuate operations comprising: determining a difference between a first value of a feature of a pixel of a first representation of a scene and a second value of the feature of a corresponding pixel of a second representation of the scene; for the first value, determining an aggregate based on the determined difference and at least one other value; and adjusting the feature of an adjustment portion of at least one of the first representation or the second representation based on the aggregate value.

Another example system is the above system with the operations further comprising excluding a pixel from the aggregate if the pixel is contained in a mask.

Another example system is the above system, with the operations further comprising constructing the mask by logically ORing a binary mask for the first representation with a binary mask for the second representation.

Another example system is the above system with the operations further comprising constructing the mask by including in the mask at least one of: a portion of the representations that are moving, and the adjustment portion.

Another example system is the above system with the operations further comprising performing a video processing operation on the compensated representation portion and a portion of the second representation corresponding to the adjustment portion, wherein the video processing operation detects the heartrate of a human object in the first representation and the second representation.

Another example system is the above system with the operations further comprising determining the aggregate by averaging a set of determined differences, wherein the set includes only pixels from the a reference frame having the same first value of the feature, and wherein the reference frame is either the first representation or the second representation.

Another example system is the above system wherein the feature of pixel is a numeric value for at least one of: red, green, blue, luminance, red-difference chroma, blue-difference chroma, or infrared, or other part of the light spectrum.

What is claimed is:

1. An apparatus comprising:
a processor; and
memory coupled to the processor, the memory comprising executable instructions that, when executed by the processor, cause the processor to effectuate operations comprising:
generating a masked reference image by applying a mask to a reference image, the masked reference image comprising a plurality of pixels that represent a part of a scene, wherein the mask indicates which pixels of the reference image are likely to break an assumption of a compensation estimation process;
generating an estimate of compensation for compensating a particular pixel value of pixels contained in the masked reference image by aggregating differences between the particular pixel value and values of pixels in a second image that correspond to pixels in the masked reference image with the particular pixel value, wherein a pixel in the reference image corresponds to a pixel in the second image when pixels represent the same part of the scene; and
generating a compensated image portion of the reference image by adding the estimate to the value of pixels that are both in a compensation portion of the reference image and also have pixel values equal to the particular pixel value.

2. The apparatus of claim 1, the operations further comprising:
generating the mask by logically ORing a binary mask for the reference image with a binary mask for the second image.

3. The apparatus of claim 1, the operations further comprising:
determining a heartrate of an object represented in the reference image and the second image based at least in part on the compensated image portion of the reference image.

4. The apparatus of claim 3, wherein:
the determined heartrate is further based on a portion of the second image corresponding to the compensation portion.

5. The apparatus of claim 1 wherein the mask comprises at least one of a portion of the images that are moving or the compensation portion.

6. The apparatus of claim 1, wherein the differences are aggregated by averaging the differences.

7. The apparatus of claim 1, wherein the pixel values represent at least one of: red, green, blue, luminance, red-difference chroma, blue-difference chroma, infrared, or a portion of the light spectrum.

8. A method comprising:
determining a difference between a first value of a feature of a pixel of a first representation of a scene and a second value of the feature of a corresponding pixel of a second representation of the scene;
determining, for the first value, an aggregate based on the determined difference and at least one other value;
excluding a pixel from the aggregate if the pixel is contained in a mask; and
adjusting the feature of a pixel in an adjustment portion of at least one of the first representation or the second representation based on the aggregate value.

9. The method of claim 8, further comprising:
constructing the mask by logically ORing a binary mask for the first representation with a binary mask for the second representation.

10. The method of claim 8, further comprising:
constructing the mask by including in the mask at least one of: a portion of the representations that are moving, and the adjustment portion.

11. The method of claim 8, further comprising:
detecting a heartrate of an object in the first representation and the second representation based at least in part on the compensated image portion of the reference image.

12. The method of claim 8, further comprising:
determining the aggregate by averaging a set of determined differences, wherein the set includes pixels from a reference frame having the same first value of the feature, and wherein the reference frame is either the first representation or the second representation.

13. A system comprising:
a processor; and
a memory coupled to the processor, the memory comprising executable instructions that, when executed by the processor, cause the processor to effectuate operations comprising:
determining a difference between a first value of a feature of a pixel of a first representation of a scene and a second value of the feature of a corresponding pixel of a second representation of the scene;
for the first value, determining an aggregate based on the determined difference and at least one other value;
excluding a pixel from the aggregate if the pixel is contained in a mask; and
adjusting the feature of an adjustment portion of at least one of the first representation or the second representation based on the aggregate value.

14. The system of claim 13, the operations further comprising:
constructing the mask by logically ORing a binary mask for the first representation with a binary mask for the second representation.

15. The system of claim 13, the operations further comprising:
constructing the mask by including in the mask at least one of: a portion of the representations that are moving, and the adjustment portion.

16. The system of claim 13, the operations further comprising:
   detecting a heartrate of an object in the first representation and the second representation based at least in part on the compensated image portion of the reference image.

17. The system of claim 13, the operations further comprising:
   determining the aggregate by averaging a set of determined differences, wherein the set includes only pixels from a reference frame having the same first value of the feature, and wherein the reference frame is either the first representation or the second representation.

18. The system of claim 13, wherein the feature of a pixel is a numeric value for at least one of: red, green, blue, luminance, red-difference chroma, blue-difference chroma, infrared, or other part of the light spectrum.

* * * * *